Figure 1:
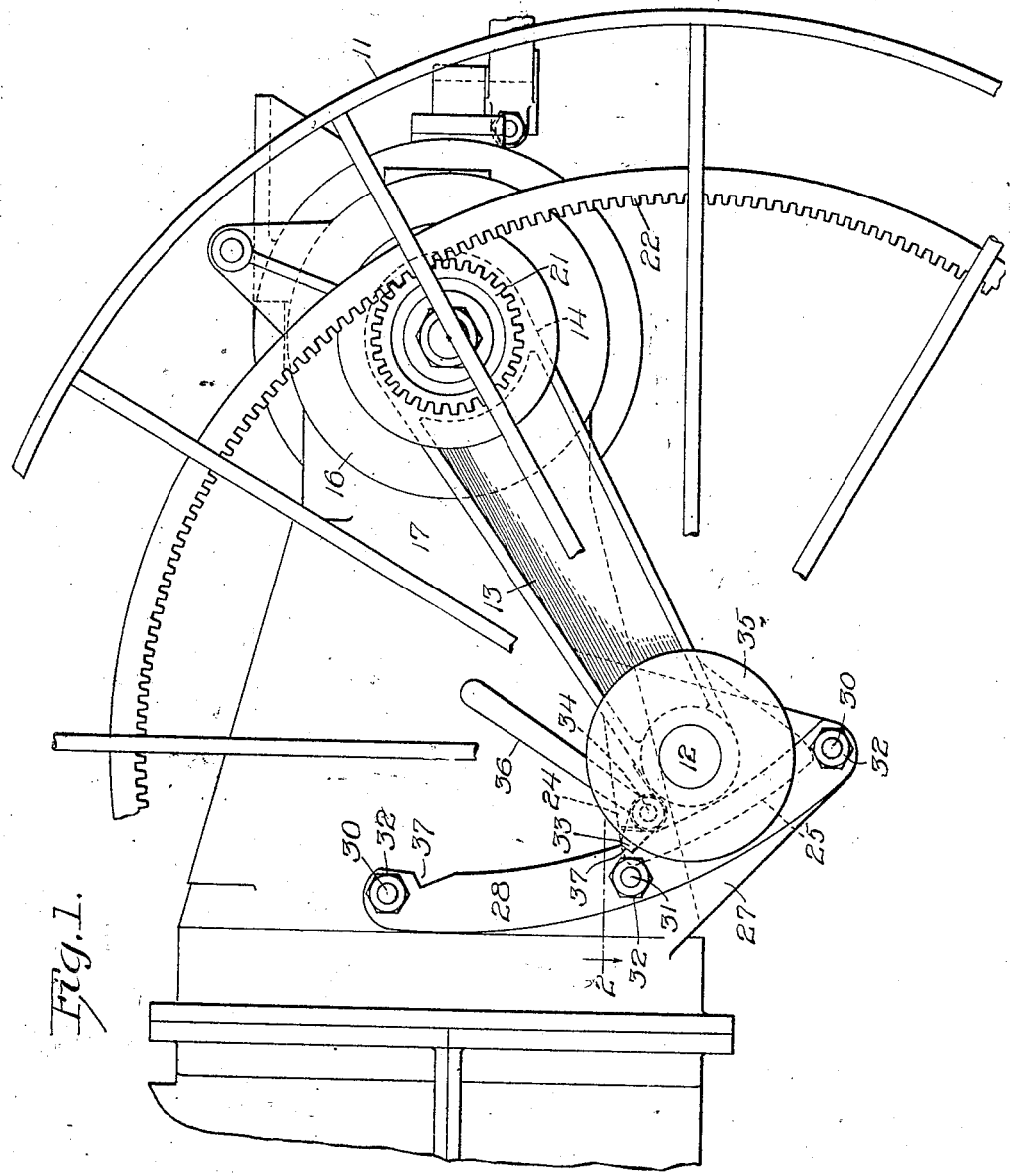

T. B. FUNK.
ADJUSTABLE SUPPORT FOR TRACTOR WHEELS.
APPLICATION FILED JUNE 5, 1917. RENEWED FEB. 26, 1920.

1,354,545.

Patented Oct. 5, 1920.
2 SHEETS—SHEET 1.

Inventor:
Truman B. Funk
by Banning & Banning
Attys.

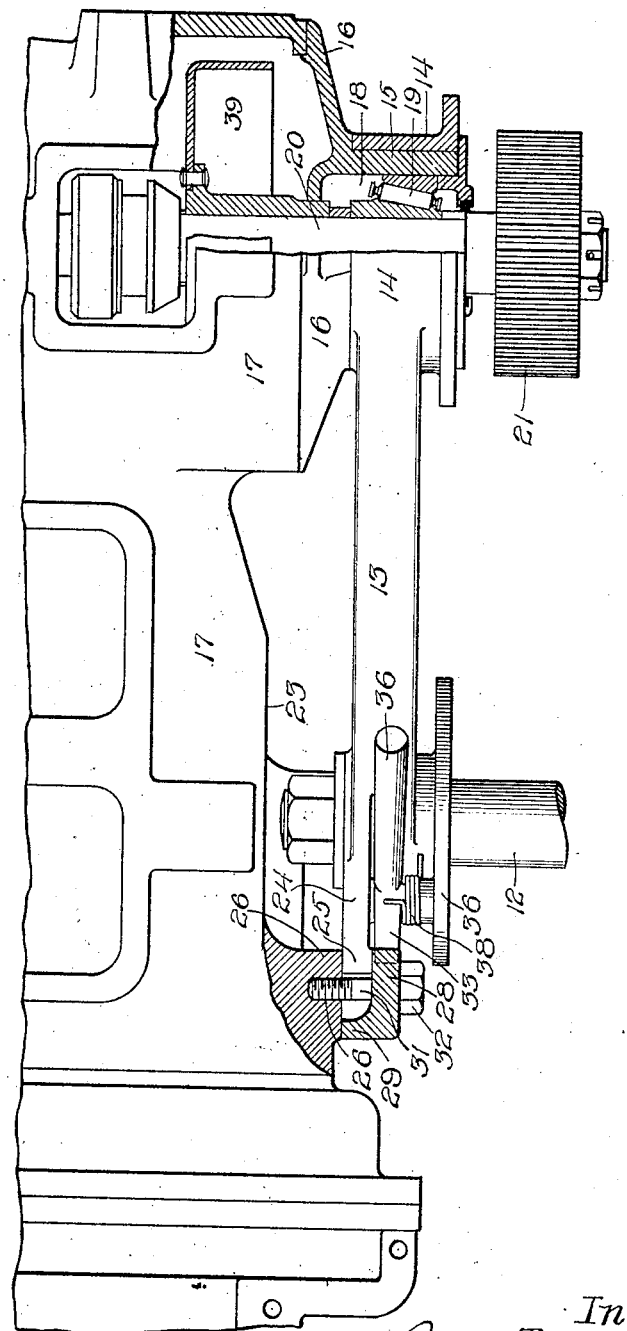

UNITED STATES PATENT OFFICE.

TRUMAN B. FUNK, OF MOLINE, ILLINOIS, ASSIGNOR TO MOLINE PLOW COMPANY, OF MOLINE, ILLINOIS, A CORPORATION OF ILLINOIS.

ADJUSTABLE SUPPORT FOR TRACTOR-WHEELS.

1,354,545.  Specification of Letters Patent.  Patented Oct. 5, 1920.

Application filed June 5, 1917, Serial No. 173,017. Renewed February 26, 1920. Serial No. 361,411.

*To all whom it may concern:*

Be it known that I, TRUMAN B. FUNK, a citizen of the United States, residing at Moline, in the county of Rock Island and State of Illinois, have invented certain new and useful Improvements in Adjustable Supports for Tractor-Wheels, of which the following is a specification.

In the construction of tractors, particularly those of the two-wheeled type, which rely for their rear support upon the trailing implement with which the tractor is associated, it is desirable to make provision for the vertical adjustment of one of the driving wheels, especially where the tractor is employed in plowing operations. This adjustment is necessary to accommodate the wheel to the depth of the furrow previously formed, for the reason that in plowing operations one of the ground wheels will travel on the unplowed ground ahead of the furrow-openers, while the other ground wheel will travel in the previously formed furrow. Of course, where the tractor is traveling on level ground, or where it is used for operations other than plowing, it is desirable to lower the ground wheel to conform to the level of the companion wheel; and the present invention is designed to provide the means for quickly effecting these adjustments without difficulty.

The object of the invention is to afford the necessary strength and rigidity which is required in mounting the heavy adjustable ground wheel of the tractor, and to make provision for the adjusting of the wheel support by means of the power derived from the tractor itself, which is desirable in view of the somewhat ponderous character of the mechanism.

Further objects will appear from a detailed description of the invention, which consists in the features of construction and combination of parts hereinafter described and claimed.

In the drawing:

Figure 1 is a side elevation of a portion of a two-wheeled tractor of the general character shown in my co-pending application Serial No. 35,784, filed June 23, 1915; and Fig. 2 is a plan view of a portion of the transmission casing showing the wheel-adjusting arm of the present invention, the part in section being along line 2 of Fig. 1.

The tractor as a whole is mounted upon a pair of power actuated ground wheels, of which the wheel 11 here shown is the adjustable landside wheel, but since this wheel alone is concerned with the details of the present invention it is not deemed necessary to make reference to the other portions of the structure.

The wheel 11, of which a portion only is shown, is mounted upon a hub carried by a stub shaft 12 socketed into and outwardly projecting from the lower end of a swinging arm 13, which latter extends rearwardly from the axial center of the adjustable ground wheel and terminates at its rear end in a head 14 which is centrally cored and swivelly mounted on a cylindrical boss 15 which projects laterally from a cap plate 16, which in turn is bolted or otherwise secured to the side of the transmission housing 17 at a point near the rear end thereof, the boss being provided with a recess 18 which houses roller bearings 19 which afford an anti-friction mounting for the transversely extending drive shaft 20 which carries a spur pinion 21 at its outer end.

The spur pinion 21 meshes with an annular internal gear 22 on the inside of the rim of the adjustable ground wheel, so that as the arm is swung up or down it will carry the ground wheel therewith, without unmeshing the gear from the driving pinion which imparts rotation to the wheel.

The transmission casing is of generally conical shape, tapering from front to rear; and in order to afford a clearance for the adjustment of the swinging arm 13 the casing is dished or flattened on its side 23. In order to hold the free end of the swinging arm in adjusted position, the arm is provided with a forwardly extending segmental plate 24, the forward end 25 of which is curved concentrically with the axis of movement, and the plate 24 is mounted to bear against the machined outer flat surface of an arcuate boss 26, cast or otherwise formed on the outer surface of the transmission housing and curving concentrically with the center of movement of the arm.

The arcuate boss 26 is extended at its lower end below the surface of the casing, the lower end being carried by a depending lug 27. The arcuate boss coöperates with an overhanging clamping plate 28 of arcuate form, which is provided on its front inner edge with an inwardly extending flange 29, which constitutes a foot adapted to bear against the surface of the arcuate boss, leaving a guide groove or channel between the boss and the clamping plate, through which groove or channel the segmental extension 24 on the swinging arm 13 is adapted to move when the parts are adjusted. The up and down movements of the segmental extension are limited by upper and lower bolts 30, so that when the plate is in position a guideway or channel, closed at its ends, will be afforded.

The clamping bolts 30 and an intermediate bolt 31 extend outwardly from the arcuate boss 26 and through bolt holes in the clamping plate, and these bolts receive nuts 32 which, when tightened, serve to hold the clamping plate in tightly clamped relation to the segmental extension 24 on the swinging arm 13. In the clamping of the parts together, the inwardly extending foot flange on the clamping plate serves as a fulcrum or bearing for the clamping adjustment, so that the clamping or crowding action of the nuts will be centered against the free overhanging edge of the clamping plate bearing against the interposed segmental extension on the swinging arm.

The forward end of the swinging arm carries a latch dog 33 which is mounted upon a pivot 34, the ends of which are socketed within a disk 35 and the segmental extension respectively, and the latch dog has integrally formed therewith and extending at right angles thereto a hand lever 36 for facilitating the adjustment of the dog. In order to normally hold the dog forwardly or in locked relation with either one of a pair of notches 37 in the edge of the clamping plate, a coil spring 38 or the like is provided, which arrangement normally holds the dog in engagement with the adjacent notch but permits the dog to be swung free therefrom when it is desired to adjust the swinging arm.

In operation, with the tractor traveling on plowed ground, the arm which carries the land ground wheel will be moved to the upper position and the furrow wheel being non-adjustable will remain at the lower level. The latch dog will engage the upper notch, and in this position the parts will be clamped and held by the tightening of the clamping plate, thus holding the land wheel raised to a higher level than the furrow wheel. When it is desired to adjust the land wheel for operating on level ground, it will be necessary to move the swinging arm to the lower position, in which the dog engages the lower notch, and this adjusting operation will involve the lifting of practically the weight of the entire tractor itself, including the weight of the engine frame and the transmission casing, so that to effect this adjustment power is required, which power will be furnished by the engine itself.

By loosening the clamping plate and reversing the engine, the driving spur pinion will be caused to crawl or climb up the gear on the driving wheel by reason of the resistance of the latter to rotation, and this movement will act to raise the weight of the tractor and throw the swinging arm downwardly into angular relation therewith, until the limit of such movement is reached, the lower bolt engaged, and the dog drops into the lower notch. During this adjustment the dog will ride free along the edge of the clamping plate, and no manual adjustment is necessary.

In order to effect an adjustment in the opposite direction and bring the two ground wheels into uneven relation, the regular engine brake 39 is applied to the driving shaft, the latch dog is thrown free from the lower notch, the brake is slightly released, and the weight of the tractor itself will cause the latter to settle down until the dog automatically engages the upper notch, after which the clamping plate will be tightened and the parts held in adjusted position.

The arrangement is an extremely simple one, and at the same time affords the required strength and rigidity to support the weight of the tractor during the various adjustments; and the dog arrangement is one which affords a ready release for the parts and at the same time automatically serves to mark the limits of the respective adjustments.

I claim:

1. In a tractor, the combination of a supporting structure, a driving pinion carried by the supporting structure, a swinging arm mounted concentrically with respect to the driving pinion, a rotatably mounted ground wheel carried by the swinging arm, a gear on the ground wheel meshing with the pinion, an extension on the swinging arm, a clamping plate overlying such extension, a clamping surface coöperating with the clamping plate, means for holding the extension in clamped relation between the clamping plate and said clamping surface, the clamping plate being provided with notches, and a spring dog carried by the swinging arm and adapted to engage a selected notch when brought into register therewith, substantially as described.

2. In a tractor, the combination of a supporting structure, a driving pinion carried by the supporting structure, a swinging arm mounted concentrically with respect to the driving pinion, a rotatably mounted ground wheel carried by the swinging arm, a gear on the ground wheel meshing with the pinion, means for locking the free end of the swinging arm in different positions of adjustment, and a brake for exerting a braking action on the driving pinion to assist in the adjustment of the swinging arm and ground wheel, substantially as described.

3. In a tractor, the combination of a supporting structure, a driving pinion carried by the supporting structure, a swinging arm mounted concentrically with respect to the driving pinion, a rotatably mounted ground wheel carried by the swinging arm, a gear on the ground wheel meshing with the pinion, a clamping plate adapted to bear against a portion of the swinging arm for holding the latter in selected positions of adjustment, and a brake for exerting a braking action on the driving pinion to assist in the adjustment of the swinging arm and ground wheel, substantially as described.

4. In a tractor, the combination of a supporting structure, a driving pinion carried by the supporting structure, a swinging arm mounted concentrically with respect to the driving pinion, a rotatably mounted ground wheel carried by the swinging arm, a gear on the ground wheel meshing with the pinion, an extension on the swinging arm, a clamping plate overlying such extension, a clamping surface coöperating with the clamping plate, means for holding the extension in clamped relation between the clamping plate and said clamping surface, and a brake for exerting a braking action on the driving pinion to assist in the adjustment of the swinging arm and ground wheel, substantially as described.

5. In a tractor, the combination of a supporting structure, a driving pinion carried by the supporting structure, a swinging arm mounted concentrically with respect to the driving pinion, a rotatably mounted ground wheel carried by the swinging arm, a gear on the ground wheel meshing with the pinion, an extension on the swinging arm, a clamping plate overlying such extension, a clamping surface coöperating with the clamping plate, means for holding the extension in clamped relation between the plate and said clamping surface, the clamping plate being provided with notches, a spring dog carried by the swinging arm and adapted to engage a selected notch when brought into register therewith, and a brake for exerting a braking action on the driving pinion to assist in the adjustment of the swinging arm and ground wheel, substantially as described.

6. In a tractor, the combination of a supporting structure, a driving pinion carried by the supporting structure, a swinging arm mounted concentrically with respect to the driving pinion, a rotatably mounted ground wheel carried by the swinging arm, a gear on the ground wheel meshing with the pinion, an extension on the swinging arm, an arcuate clamping plate overhanging said extension and provided with a flange constituting a foot, a clamping surface against which the flange bears, bolts for holding the extension clamped between the clamping plate and the clamping surface, and a brake for exerting a braking action on the driving pinion to assist in the adjustment of the swinging arm and ground wheel, substantially as described.

TRUMAN B. FUNK.